United States Patent

Bettelini

[11] Patent Number: 5,945,763
[45] Date of Patent: Aug. 31, 1999

[54] MOTOR COIL FOR A TIMEPIECE

[75] Inventor: Marco Bettelini, Prêles, Switzerland

[73] Assignee: Eta Sa Fabriques D'Ebauches, Grenchen, Switzerland

[21] Appl. No.: 09/115,247

[22] Filed: Jul. 14, 1998

[30] Foreign Application Priority Data

Jul. 15, 1997 [CH] Switzerland .............................. 1727/97

[51] Int. Cl.⁶ ................................ H02K 3/30; H02F 5/06
[52] U.S. Cl. .......................... 310/194; 310/49 R; 310/42; 336/198
[58] Field of Search ..................... 310/194, 162, 310/49 R, 42; 337/198; 29/596

[56] References Cited

U.S. PATENT DOCUMENTS

| | | | |
|---|---|---|---|
| 3,189,772 | 6/1965 | Wingler et al. ........................... | 310/194 |
| 3,855,490 | 12/1974 | Sidell ........................................ | 310/162 |
| 4,617,543 | 10/1986 | Akachi et al. ........................... | 336/198 |
| 5,531,390 | 7/1996 | Gustafson ............................. | 242/441.2 |
| 5,696,478 | 12/1997 | Weiner ..................................... | 336/198 |

FOREIGN PATENT DOCUMENTS

| | | | |
|---|---|---|---|
| 582714 | 4/1992 | European Pat. Off. ......... | H02K 3/50 |
| 55-144740 | 11/1980 | Japan ................................ | H02K 3/52 |
| 2012117 | 11/1978 | United Kingdom ............. | H02K 3/30 |

OTHER PUBLICATIONS

Patent Abstracts of Japan vol. 005, No.015 (E–043), Jan. 29, 1981 & JP 55 144740 A (Citizen Watch Co Ltd), Nov. 11, 1980.

Patent Abstracts of Japan, vol. 004, No. 121 (E–023), Aug. 27, 1980 & JP 55 077342 A (Citizen Watch Co. Ltd.), Jun. 11, 1980.

*Primary Examiner*—Thomas M. Dougherty
*Assistant Examiner*—B. Mullins
*Attorney, Agent, or Firm*—Sughrue, Mion, Zinn, Macpeak & Seas, PLLC

[57] ABSTRACT

The coil (1) of the motor includes a coil body carrying two flanges (7, 8). Made in one piece with one of the flanges (8), a plate (10) covers a lug (4) of the core. This plate (10) acts as anchoring point for the output wires (11, 12) of a wire winding (9) by embedding of the end zones (13, 14) of each of said wires in the plate. Prior to reaching the end zones (13, 14), the wires (11, 12) follow a channel (15) made in the plate, a hole (16, 17) arranged perpendicular to the wires and ending in this channel, being made both in the plate and in the lug.

5 Claims, 5 Drawing Sheets

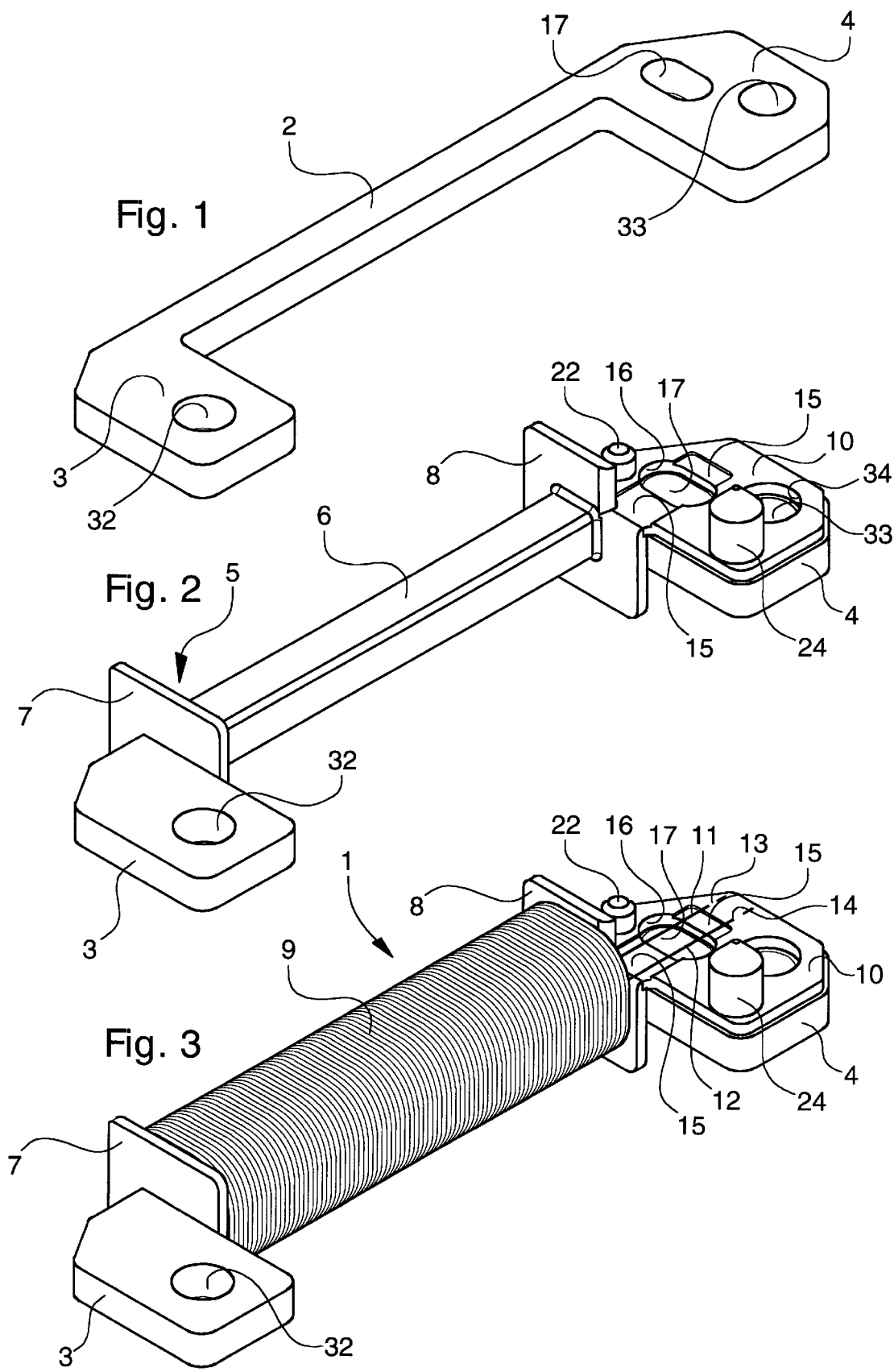

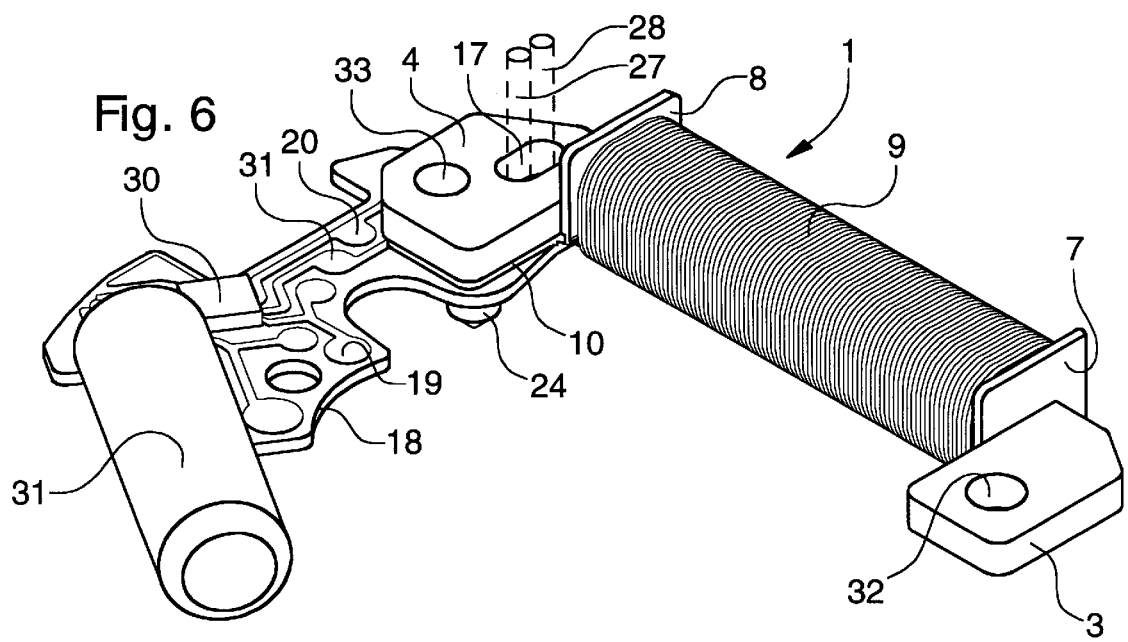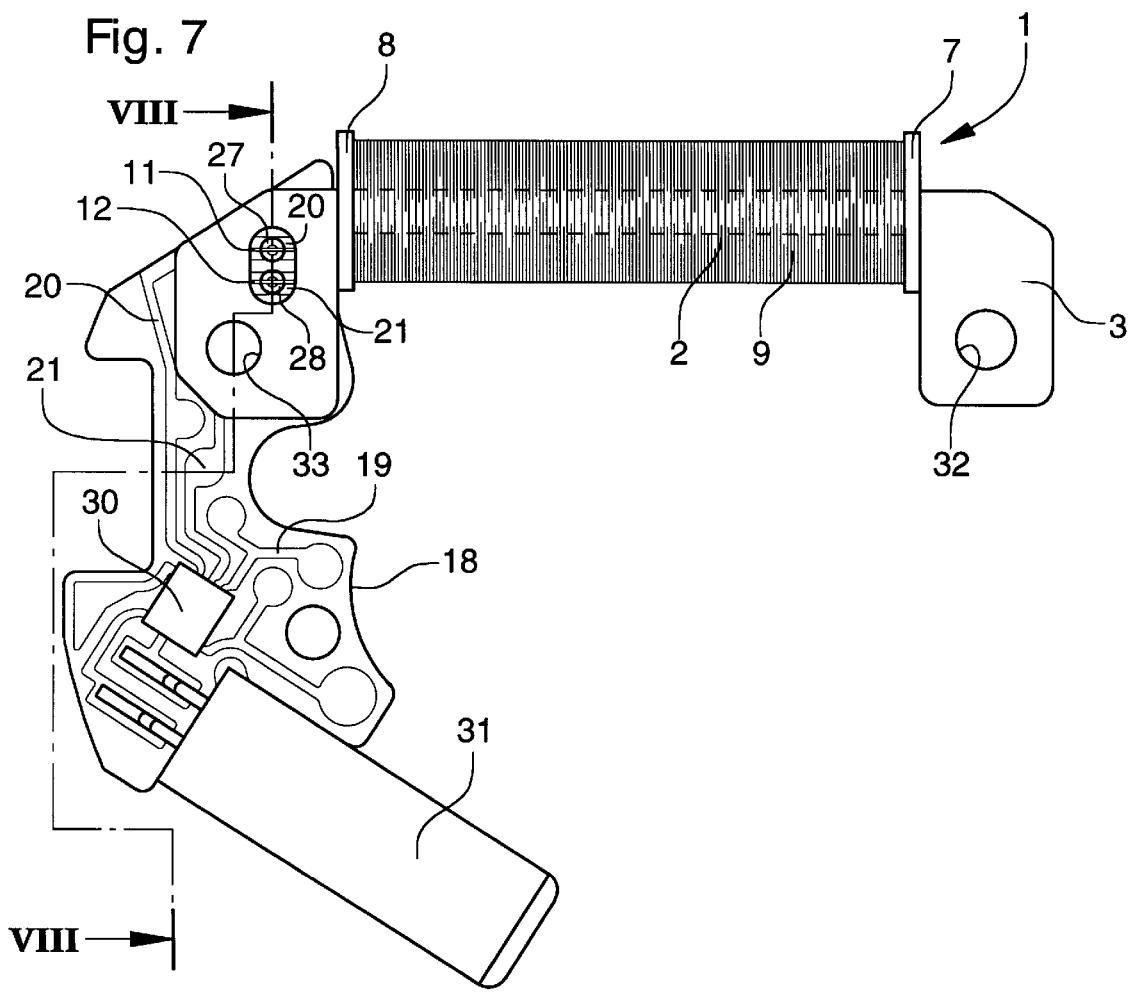

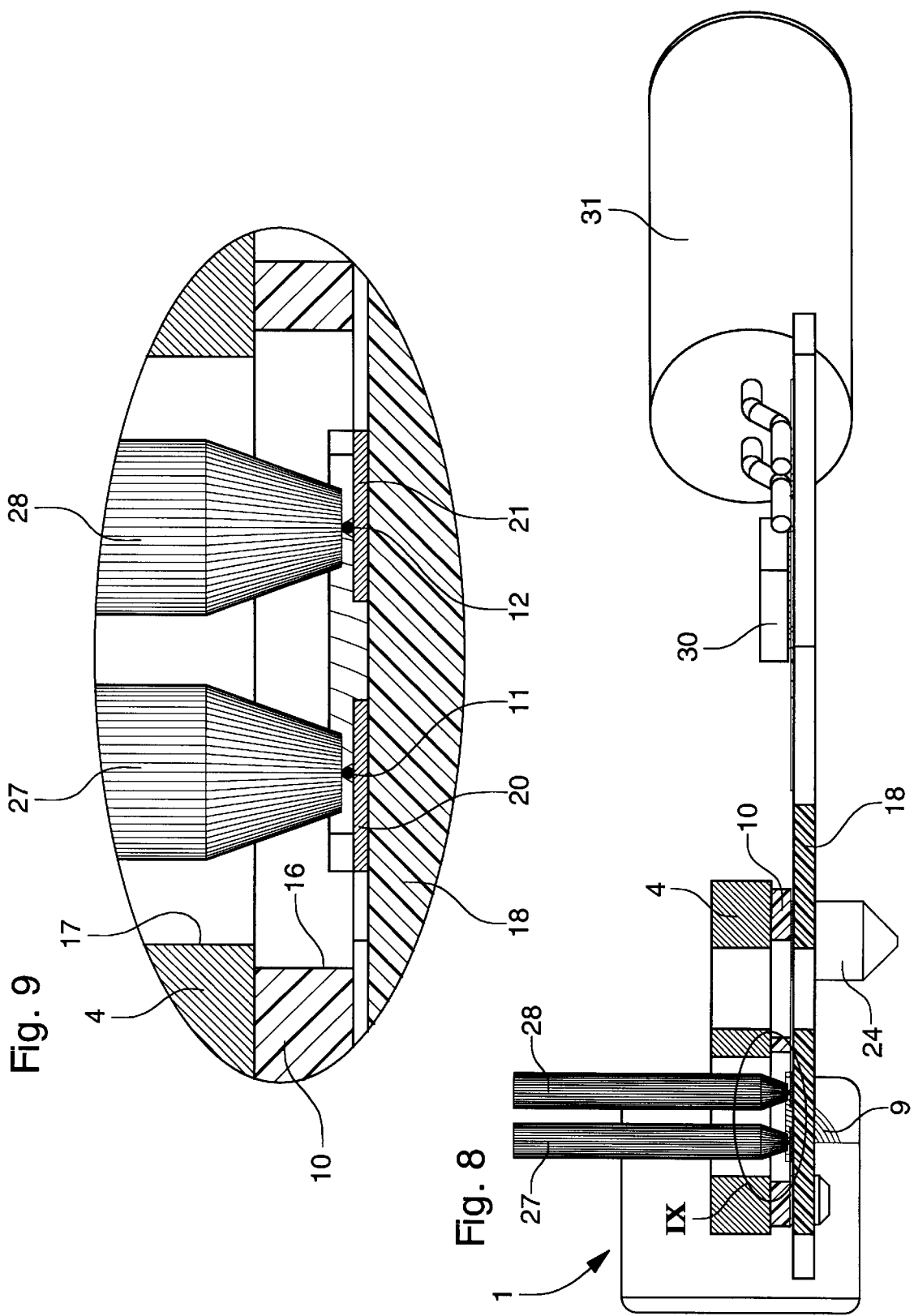

MOTOR COIL FOR A TIMEPIECE

BACKGROUND OF THE INVENTION

The present invention relates to a motor coil actuating the display means of a timepiece, said coil including a magnetisable core each of whose ends includes a lug, an insulating coil body formed of a tube surrounding the core and a flange disposed at each of the ends of the tube, and a winding wound around the body of the coil.

A coil whose structure resembles quite closely that which has just been described is shown in Patent Application JP 30712/86. This document also describes a core provided with two lugs, two flanges holding the winding and an insulating film surrounding the core. On one of the lugs is affixed a printed circuit with two paths each receiving an output wire of the coil winding. The coil and the place where the wires are connected to the circuit are covered with a protective coating. It is not clearly stated how these connections are achieved. One may imagine however that the wires are bonded with tin solder on the printed circuit paths in accordance with the standard method. Whatever, the connection of the winding output wires to the rest of the circuit always poses manufacturing problems. As a matter of fact, it should be known that the winding wire is extremely fine since diameters of the order of 20 $\mu$m are currently used. A wire of such fineness is difficult to manipulate, very fragile and subject to frequent breakages which lead to the coil being discarded. Moreover, if the bonding is performed with tin solder, stripping of the wire is also a problem, which further increases the risk of breakage. Testing the proper manufacture of the winding after it has been wound by measuring the electric resistance is also a problem. Most of the time this test takes place after bonding of the wires onto the circuit paths, an operation which could be avoided if the test was made directly on the output wires before bonding.

SUMMARY OF THE INVENTION

With the object of avoiding manipulation of the output wires, allowing the winding to be tested before connection to the rest of the circuit, and avoiding breakage of the wire, the present invention is characterized in that a plate, made in one piece with one of the flanges and arranged so as to rest on one of the lugs of the core acts as anchoring point for the winding output wires by incrustation of the end zones of each of the wires in the plate. This arrangement then allows various methods for facilitating testing and bonding of the output wires, which will be explained hereinafter, to be implemented.

The present invention will now be described in detail on the basis of an embodiment given by way of example and illustrated by the drawings, in which:

BRIEF DESCRIPTION OF THE DRAWINGS

FIG. 1 shows the core of the coil with two lugs;

FIG. 2 shows the coil body fitted with two flanges and a plate forming part of one of the flanges;

FIG. 3 shows the finished coil with its winding, its output wires being incrusted in the plate;

FIG. 6 shows a printed circuit attached to the coil and how to bond the winding output wires to the circuit paths;

FIG. 7 is a top view of what is shown in perspective in FIG. 6;

FIG. 8 is a cross-section along line VIII—VIII shown in FIG. 7;

FIG. 9 is an enlargement of region IX of FIG. 8;

DESCRIPTION OF THE PREFERRED EMBODIMENTS

Figure 4:
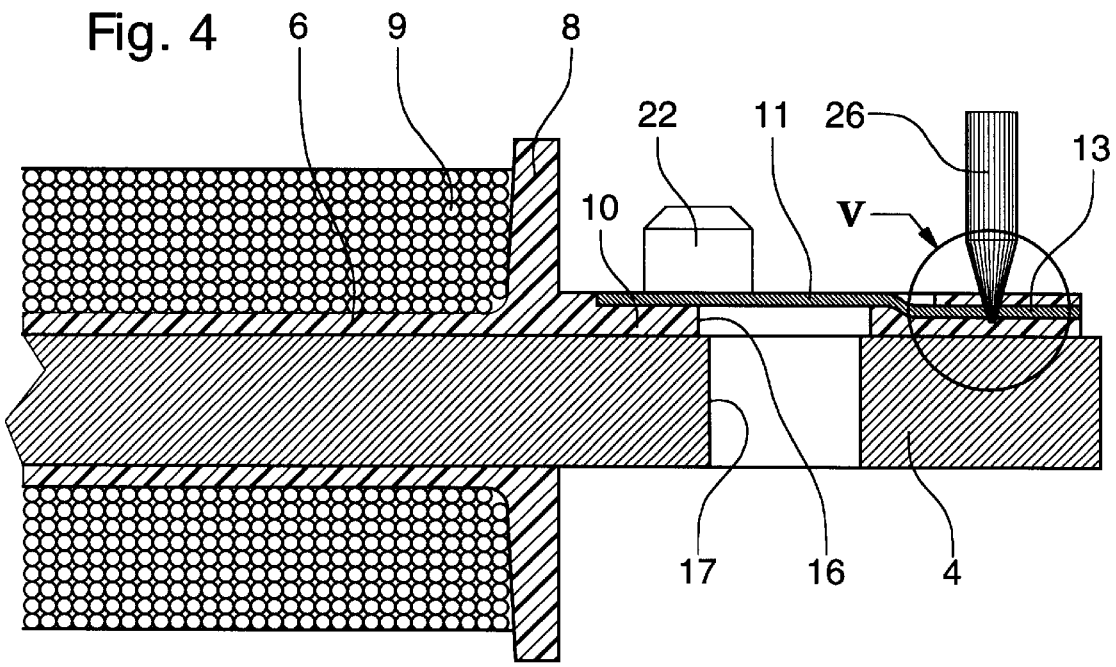
FIG. 4 is a partial cross-section of the coil showing how one sets about testing it.

The method for making coil 1 according to the invention is illustrate in FIGS. 1 to 3. This coil includes first a magnetisable core 2 whose left end includes a lug 3 and whose right end includes a lug 4 as is shown in FIG. 1. Lug 3 is provided with an opening 32 and lug 4 with an opening 33. These openings 32 and 33 allow the motor stator to be fixed to the core, this stator including, as is known, polar pieces surrounding the motor rotor. As is seen in FIG. 2, core 2 is surrounded by a coil body 5 made of insulating material and including a tube 6 and two flanges 7 and 8 arranged respectively at the end of tube 6. As FIG. 3 shows, a wire winding 9 is wound around coil body 5. The output wires of this winding are shown in FIG. 3 and referenced 11 and 12.

According to the invention and as is shown clearly in FIG. 2, one of the flanges 8 of the coil body includes a plate 10 made in one piece with flange 8. This plate is arranged to rest on lug 4 of core 2. It will be understood that tube 6, flanges 7 and 8 and plate 10 can be moulded in a single operation respectively around core 2 and onto lug 4. It will be mentioned in passing that the material used for such moulding may be Lucryl KR 2013 (registered trademark) from the BASF company. As is shown in FIG. 3, flange 10 acts as an anchoring point for output wires 11 and 12 of winding 9. As a matter of fact, as FIG. 3 also shows, wires 11 and 12 are anchored in plate 10 via incrustation or embedding of their end zones 13 and 14. This incrustation, seen in cross-section in FIG. 5, may be achieved in different ways, for example by local heating of plate 10 by means of a thermotrode, which allows wires 11 and 12 to be sunk or embedded into the material forming the plate. As the winding is intended to be performed on an automatic machine, the same machine could perform said incrustation. End zone 13 of output wire 11 is first incrusted in plate 10. The wire is then brought through flange 8, over core 2, then wound around this core. Once the winding is finished, output wire 12 is brought, through flange 8, to its anchoring zone 14 where it is incrusted in flange 10.

Figure 5:
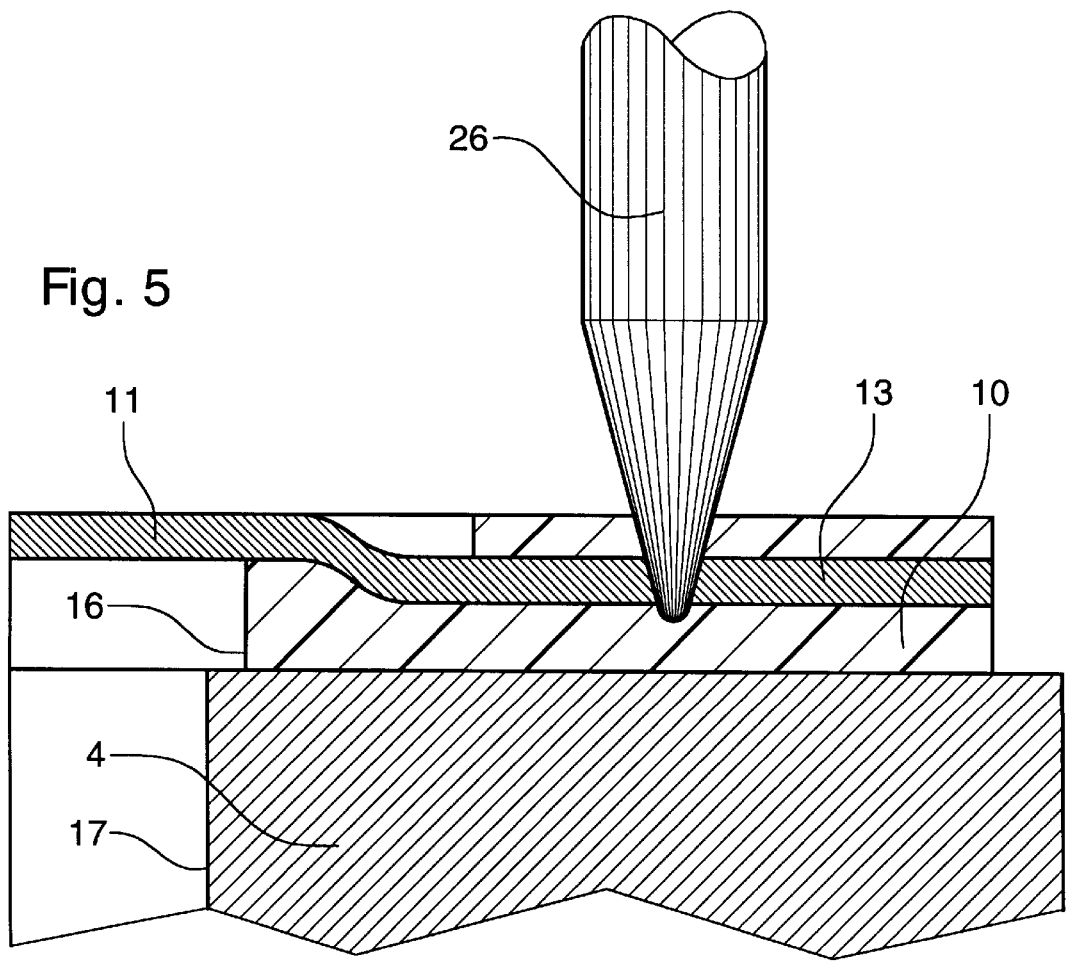
FIG. 5 is an enlargement of region V of FIG. 4.
Figure 10:
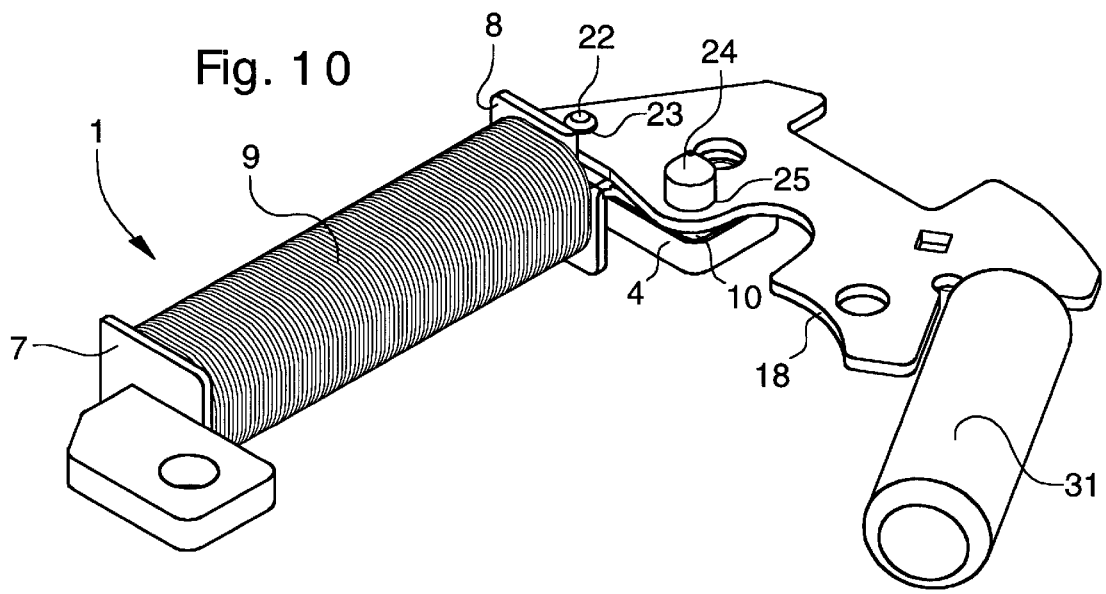
FIG. 10 is a view from below of the assembly shown in FIG. 6, the printed circuit not yet having been fixed to the plate.

At this stage, proper manufacture of the coil can be tested, such testing being shown in FIG. 4 which shows in partial cross-section the end of the coil fitted with plate 10, and in FIG. 5 which shows an enlargement of zone V of FIG. 4. For such testing, a measuring probe, which nicks plate 10 locally and then comes into contact with wire 11, is applied to end zone 13 of output wire 11. The same operation is performed on output wire 12 to which another measuring probe 26 (not shown) is applied. The electric resistance of the winding between the two probes 26 is thus measured. This method avoids having to strip the wires with the inherent drawbacks and risks linked to such an operation. It also allows immediate testing of the coil alone when its manufacturing is completed and before it is associated with the rest of the circuit.

Different solutions can be envisaged for connecting output wires 11 and 12 to the motor electric control circuit. According to an original feature of the invention, FIG. 3 shows that before reaching incrustation end zones 13 and 14, output wires 11 and 12 follow a channel 15 (see also FIG. 2) made in plate 10. Two concentric holes, one 16 made in plate 10 and the other 17 made in lug 4, are disposed perpendicular to wires 11 and 12 and end in channel 15. This arrangement thus defines a zone where output wires 11 and 12 are accessible from everywhere and where they can thus be connected to the electric circuit.

According to another original feature of the present invention, the connections of output wires 11 and 12 to the electric circuit are achieved in the following manner.

The electric circuit is in the form of a printed circuit 18 as illustrated in perspective in FIG. 6 and in plane in FIG. 7. This printed circuit 18 is fitted with conductive paths 19. It is able to provide driving pulses to the motor, generated in the usual manner by a quartz 31 and an integrated circuit 30. Printed circuit 18 is applied against plate 10 and, as is shown clearly by FIG. 7, conductive paths 20 and 21, capable of supplying the motor, face corresponding output wires 11 and 12 of winding 9 of coil 1. Opposite hole 16, 17 made both in plate 10 and in lug 4, output wires 11 and 12 are bonded to conductive paths 20 and 21.

A method showing how these bonds are achieved is illustrated in FIGS. 8 and 9. FIG. 8 is a cross-section along line VIII—VIII of FIG. 7 and FIG. 9 is an enlargement of zone IX of FIG. 8. When printed circuit 18 is placed against plate 10 as described in the preceding paragraph, a pin 27 is applied, through hole 17 of lug 4 and hole 16 of plate 10, these holes being arranged in a row, on wire 11 and another pin 28 is applied on wire 12. By exerting pressure on these pins and heating them, wires 11 and 12 are bonded onto paths 20 and 21, respectively, by thermocompression. This operation does not require any stripping of the wires, nor any additional solder material, and can be performed by an automatic machine.

The above description shows that manufacturing of coil 1 and its connection to printed control circuit 18 can be automated to the maximum with a minimum of discard. This of course contributes to significant reductions in the cost price of the assembly.

Figure 11:
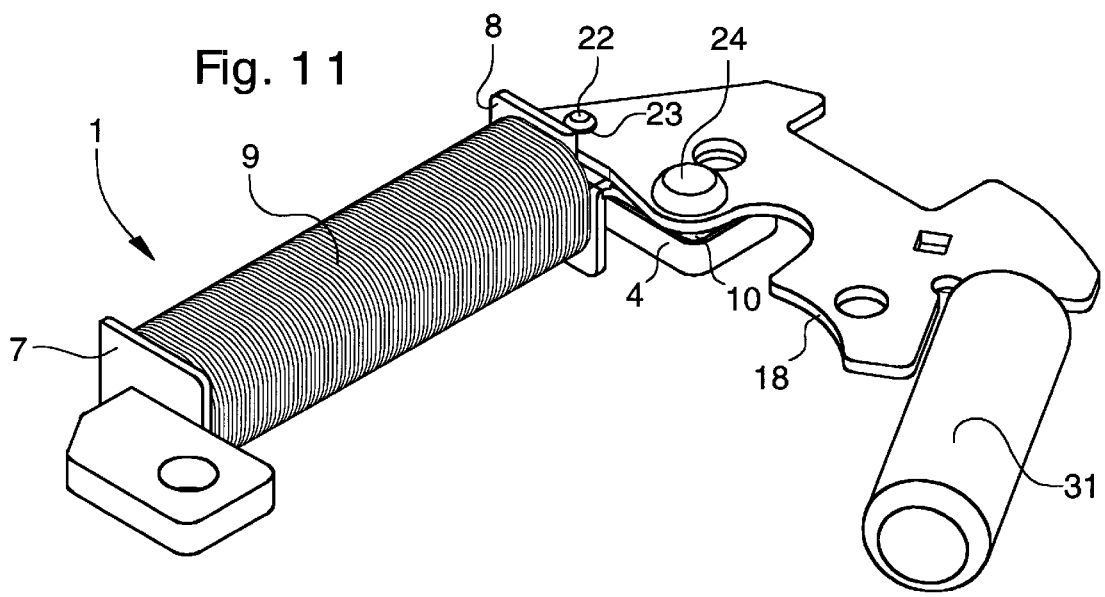
FIG. 11 is a similar view to that of FIG. 10 in which the printed circuit has been fixed to the plate.

It remains to be explained how to set about fixing printed circuit 18 onto plate 10, by specifying that this fixing takes place prior to the bonding of wires 11 and 12. Reference will be made for this purpose to FIGS. 2, 3, 10 and 11. As FIGS. 2 and 3 show, plate 10 carries a first stud 22 formed when plate 10 is moulded and a second stud 24 moulded in the same way. As FIG. 10 (which shows printed circuit 18 shown from below) shows, this circuit 18 includes a first hole 23 through which first stud 22 passes and a second hole 25 through which second stud 24 passes when circuit 18 is placed onto plate 10. As FIG. 11 shows, the function of stud 22 is to guide and orient circuit 18, while the function of stud 24 is to fix said circuit 18, this fixing being achieved by heating the end of said second stud 24 to rivet printed circuit 18 finally onto plate 10.

What is claimed is:

1. A motor coil actuating display means of a timepiece, said coil comprising a magnetizable core each of whose ends includes a lug, an insulating coil body formed of a tube surrounding the core and a flange disposed at each of the ends of the tube, a winding wound around said tube of the coil body, and a plate, made in one piece with one of the flanges and arranged so as to rest on one of the lugs of the core, said plate acting as an anchoring point for two output wires of the winding by incrustation embedding of respective end zones of the output wires in the plate.

2. A coil according to claim 1, wherein prior to reaching the embedded end zones, the output wires follow a channel made in the plate, and wherein a hole arranged perpendicular to the wires and ending in said channel is made both in the plate and in the lug.

3. A coil according to claim 2, wherein a printed circuit provided with conductive paths and able to supply the motor with driving pulses is applied against the plate, the conductive paths supplying the motor facing the corresponding output wires of the winding, said paths being bonded to said wires opposite the hole made both in the plate and in the lug.

4. A coil, according to claim 3, wherein the plate carries a first stud passing through a first hole made in the printed circuit to guide and orient said circuit and a second stud passing through a second hole of said circuit to fix it onto said plate.

5. The coil according to claim 1, wherein the coil body and the plate are moulded in a single piece to form an integral structure.

\* \* \* \* \*